United States Patent [19]

Kley

[11] 4,214,122
[45] Jul. 22, 1980

[54] RESISTIVE PLANAR GRAPHICAL ENTRY DEVICE

[75] Inventor: Victor B. Kley, Berkeley, Calif.

[73] Assignee: Kley, Fitting, Fitting, Nalley and Smith, Berkeley, Calif.

[21] Appl. No.: 18,031

[22] Filed: Mar. 6, 1979

Related U.S. Application Data

[63] Continuation-in-part of Ser. No. 867,516, Jan. 6, 1978, which is a continuation-in-part of Ser. No. 712,748, Aug. 9, 1976, Pat. No. 4,079,194.

[51] Int. Cl.² .............................................. G08C 21/00
[52] U.S. Cl. ...................................................... 178/18
[58] Field of Search ............................ 178/18, 19, 20; 340/146.3 SY, 365 S, 365 C, 365 A; 33/1 M; 324/62, 71 R

[56] References Cited

U.S. PATENT DOCUMENTS

| | | | |
|---|---|---|---|
| 2,900,446 | 8/1959 | McLaughlin et al. | 178/18 |
| 3,522,664 | 8/1970 | Lambright et al. | 178/18 |
| 3,591,718 | 7/1971 | Asano et al. | 178/19 |
| 3,699,439 | 10/1972 | Turner | 178/18 |
| 3,798,370 | 3/1974 | Hurst | 178/18 |
| 4,079,194 | 3/1978 | Kley | 178/18 |

Primary Examiner—Thomas A. Robinson
Attorney, Agent, or Firm—O'Brien & Marks

[57] ABSTRACT

In a resistive planar graphic device, conductor strips are divided into two segments and corner resistances interconnect outer ends of the conductor strips which extend in spaced relationship along the edges of a rectangular resistive area and which are connected by edge connecting and isolating resistances to the edges of the rectangular area. The corner resistances are selected to improve the linearity of voltage gradients in the rectangular area.

6 Claims, 1 Drawing Figure

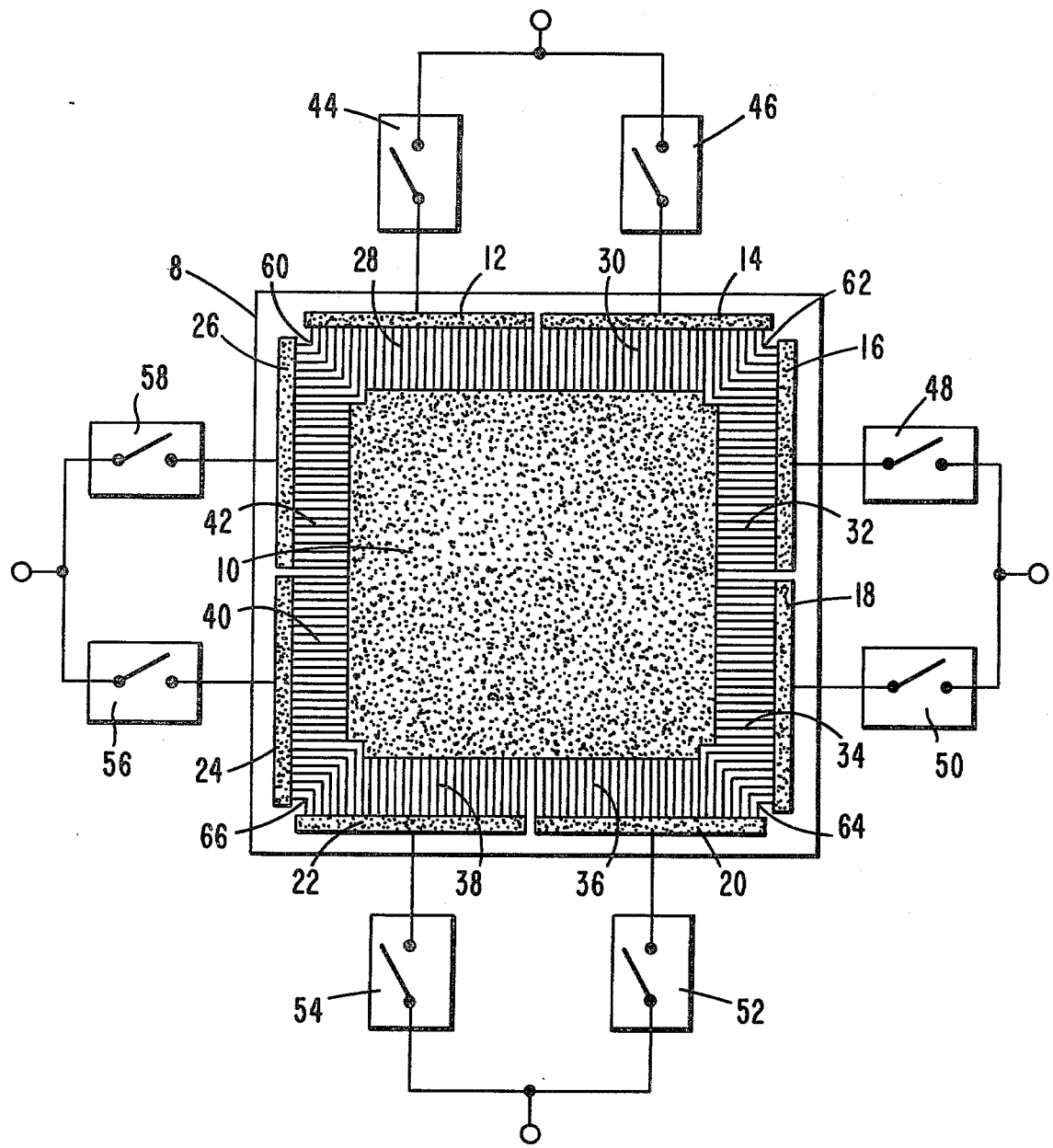

RESISTIVE PLANAR GRAPHICAL ENTRY DEVICE

CROSS-REFERENCE TO RELATED APPLICATIONS

This application is a continuation in part of my copending application Ser. No 867,516 filed Jan. 6, 1978 for Electrical Data Entry Devices which was a continuation in part of my application Ser. No. 712,748 filed Aug. 9, 1976 for Graphical Data Entry Pad (now U.S. Pat. No. 4,079,194 issued Mar. 14, 1978). This copending application Ser. No. 867,516 and Pat. No. 4,079,194 are incorporated herein by reference.

TECHNICAL FIELD

This invention relates to entry device for entering graphical data into data processing or communication systems; and more particularly, to such devices employing rectangular resistive planes usable with contact probes, capacitance probes, parallel conductive planes, etc. for generating electrical analogue signals corresponding to entered graphical data.

BACKGROUND ART

The prior art, as exemplified in U.S. Pat. Nos. 2,900,446, 3,522,664, 3,591,718, 3,699,439 and 3,798,370, contains a number of graphical entry devices employing rectangular resistive sheets or planes. Voltages are alternately applied across the opposite edges of the rectangular resistive plane and the analogue value of a voltage generated on a contact probe, a capacitance probe or a depressed portion of a conductor sheet overlying the resistance plane is sensed to determine the two-dimensional position of the probe or depressed portion. When the rectangular resistive planes are energized by means of electodes connected directly to the edges of the resistive plane, such as in the above-mentioned U.S. Pat. No. 2,900,446, the electrodes on the non-energized edges shunt such edges to produce nonlinearity of the voltage gradient within the adjacent portions of the resistance plane. In the U.S. Pat. Nos. 3,522,664 and 3,699,439, point electrodes spaced along each of the sides are isolated by pluralities of diodes connected to the energizing source; the use of pluralities of diodes to isolate the edge contact points substantially increases the cost of the graphical entry device. Another arrangement for increasing the linearity within a rectangular resistive plane as disclosed in the U.S. Pat. Nos. 3,591,718 and 3,798,370 includes low resistance connections to the edges of the rectangular area so that the non-energized edges are maintained linear by means of voltage gradients in the low resistance edges; this requires relatively large operating currents as well as producing heating and electromagnetic interference which are generally undesirable in devices for low-power electronic circuits.

SUMMARY OF THE INVENTION

The invention is summarized in a graphical entry device inluding an electrically insulated substrate; and a patterned resistive layer on the substrate wherein the patterned resistive layer includes a rectangular graphic area with four edges and four corners, four pairs of conductor strips spaced from and extending along the respective four edges of the graphic area, each conductor strip of the four pairs of conductor strips extending along a respective one half of a respective edge of the four edges from a respective corner of the four corners to a middle portion of the respective edge, four edge connecting means joining the respective pairs of conductor strips to the respective edges, the four edge connecting means each having an effective resistance parallel to the respective edges of the rectangular graphic area substantially greater than that of the graphic area and the four pairs of conductor strips, and four corner connecting means joining outer end portions of the four pairs of conductor strips adjacent to the respective four corners, each of the four corner connecting means having an effective resistance which is substantially greater than that of the graphic area and the four pairs of conductor strips and which is selected to improve the linearity of a voltage gradient in the rectangular graphic area.

An object of the present invention is to construct a relatively inexpensive graphical entry device using a resistive rectangular plane in which voltage values are substantially improved in linearity.

Another object of the invention is to employ both high resistance edge connecting means for the edges of a rectangular resistive plane and high resistance corner connecting means for providing side parallel voltages to substantially overcome nonlinearity within the rectangular resistive plane.

Other objects, advantages and features of the present invention will be apparent from the following description of the preferred embodiment taken in conjunction with the accompanying drawing.

BRIEF DESCRIPTION OF THE DRAWING

The drawing is a plan view of a resistive graphical entry device in accordance with the present invention.

DESCRIPTION OF THE PREFERRED EMBODIMENT

As illustrated in the drawing, the invention is embodied in a graphical entry device including a substrate 8 having an upper surface upon which is attached a patterned resistive layer or plane. The central portion of this resistive plane is formed by a rectangular resistive graphical area 10 having four edges and four corners (the corners not necessarily being exactly square). Pairs of conducting strips 12, 14, 16 18, 20, 22, 24 and 26 of the resistive plane are spaced from and parallel to the respective edges of the rectangular area 10. Each resistive strip of these pairs of resistive strips extends along one half of the respective edge from the middle of the edge past the respective corner of the rectangular area 10. The conducting strips 12, 14, 16, 18, 20, 22, 24 and 26 are connected by respective pluralities of narrow strips or lines 28, 30, 32, 34, 36, 38, 40 and 42 to the respective halves of the edges of the rectangular area 10. The edge connecting strips 28, 30, 32, 34, 36, 38, 40 and 42 have an effective resistance, parallel to the respective edges to which they are connected, which is substantially greater than the resistance of the rectangular area 10 so that shunting of the edges by the conductor strips 12, 14, 16, 18, 20, 22, 24 and 26 is substantially reduced. Similar high resistance connecting means for joining electrodes to the edges of a rectangular graphical resistance area are disclosed in applicant's copending U.S. application Ser. No. 867,516 filed Jan. 6, 1978 for Electrical Data Entry Devices and applicant's U.S. application Ser. No. 712,748 filed Aug. 9, 1976 (now U.S. Pat. No. 4,079,194 issued Mar. 14, 1978).

The present graphical entry device differs from applicant's previously disclosed devices in that there is a pair of the conductor strips 12, 14, 16, 18, 20, 22, 24 and 26 associated with each edge of the rectangular resistance area 10 and in that high resistive corner connecting means 60, 62, 64 and 66 are provided between outer end portions of adjacent conducting strips adjacent the corners of the rectangular resistive area 10. The resistive means 60 is formed by a plurality of narrow strips or lines of the resistive material connecting the outer end of resistive strip 12 to the outer end of resistive strip 26, while the resistive means 62, 64 and 66 are similarly formed by pluralities of narrow strips or lines of conductive material interconnecting the outer ends of the conductive strips 14 and 16, strips 18 and 20, and strips 22 and 24, respectively.

Preferably the rectangular graphical area 10, the conductor strips 12, 14, 16, 18, 20, 22, 24 and 26, the edge connecting strips 28, 30, 32, 34, 36, 38, 40 and 42 and the corner connecting strips 60, 62, 64 and 66 are all formed from the same resistive material. The configuration or pattern of the resistive plane may be formed by screen printing the pattern from a suitable resistive material onto the substrate, by vacuum depositing through a mask, or by etching a layer of the resistive material through a mask.

In one application of the present graphical entry device, the conductor strips 12 and 14 are connected by respective electronic switches 44 and 46 to one voltage terminal while the opposite conducting strips 20 and 22 are connected by respective electronic switches 52 and 54 to the opposite voltage terminal; and the conductor strips 16 and 18 are connected by respective switches 48 and 50 to one voltage terminal while the conductor strips 24 and 26 are connected by respective electronic switches 56 and 58 to the opposite voltage terminal. The switches 44, 46, 52 and 54 will be simultaneously operated while the switches 48, 50, 56 and 58 are open and the switches 48, 50, 56 and 58 will simultaneously operated while the switches 44, 46, 52 and 54 are open.

Splitting the electrodes or conducting strips into pairs on each edge of the graphical entry device and feeding corrective charges through the corner connecting strips 60, 62, 64 and 66 results in substantially improved linearity in the voltage gradient produced in the rectangular area 10. Further the present graphical entry device can be produced by relatively inexpensive techniques.

In the manufacture of graphical entry devices, variations in the resistive material and the non-linearity produced thereby can be corrected in the present device by opening one or more of the narrow conducting strips 28, 30, 32, 34, 36, 38, 40 and 42 in the edge connecting means and/or by opening one or more of the connecting strips 60, 62, 64 and 66 in the corner connecting means. These strips may be opened by (1) application of a high current to the respective strip by means of a probe which causes the burning off of the strip, (2) by mechanically scraping or breaking the respective strip or (3) by means of a laser to vaporize a respective strip. The strips forming each of the corner connecting means 60, 62, 64 and 66 are of different resistances so that a selected strip can be opened or broken to provide a more selective correction of nonlinearity.

Inasmuch as the present invention is subject to many variations, modifications and changes in detail, it is intended that all material in the foregoing specification and in the accompanying drawings be interpreted in an illustrative and not in a limiting sense.

What is claimed is:

1. A graphical entry device comprising an electrically insulated substrate; and a patterned resistive layer on the substrate wherein the patterned resistive layer includes a rectangular graphic area with four edges and four corners, four pairs of conductor strips spaced from and extending along the respective four edges of the graphic area, each conductor strip of the four pairs of conductor strips extending along a respective one half of a respective edge of the four edges from a respective corner of the four corners to a middle portion of the respective edge, four edge connecting means joining the respective pairs of conductor strips to the respective edges, said four edge connecting means each having an effective resistance parallel to the respective edges of the rectangular graphic area substantially greater than that of the graphic area and the four pairs of conductor strips, and four corner connecting means joining outer end portions of the four pairs of conductor strips adjacent to the respective four corners, each of said four corner connecting means having an effective resistance which is substantially greater than that of the graphic area and the four pairs of conductor strips and which is selected to improve the linearity of a voltage gradient in the rectangular graphic area.

2. A graphical entry device as claimed in claim 1 wherein the patterned resistive layer is formed from a resistive material of uniform resistance and the four edge connecting means and four corner connecting means are configured to form the substantially greater resistances.

3. A graphical entry device as claimed in claim 2 wherein the outer end portions of the four pairs of conductor strips extend past the respective corners, the four edge connecting means includes respective pluralities of parallel narrow strips of the resistive material extending between the respective conductor strips and the respective four edges of the graphic area, and the four corner connecting means includes respective pluralities of narrow strips of the resistive material extending between the outer portions of the conductor strips adjacent the respective corners.

4. A graphical entry device as claimed in claim 3 wherein the strips of each plurality of narrow strips of the respective four connecting means have different lengths.

5. A graphical entry device as claimed in claim 3 or 4 wherein there is included one or more broken narrow strips in the narrow strips forming the four corner connecting means, said broken narrow strips having been broken to adjust the linearity of the graphical entry device.

6. A graphical entry device as claimed in claim 3 or 4 wherein there is included one or more broken narrow strips in the strips forming the edge connecting means, said broken narrow strips having been broken to adjust the linearity of the graphical entry device.

* * * * *